(12) United States Patent
Jones (10) Patent No.: US 11,632,936 B1
(45) Date of Patent: Apr. 25, 2023

(54) COMBINATION LEASH AND HOSE

(71) Applicant: Corrie Lynn Jones, Jupiter, FL (US)

(72) Inventor: Corrie Lynn Jones, Jupiter, FL (US)

( * ) Notice: Subject to any disclaimer, the term of this patent is extended or adjusted under 35 U.S.C. 154(b) by 23 days.

(21) Appl. No.: 16/845,368

(22) Filed: Apr. 10, 2020

Related U.S. Application Data (60) Provisional application No. 62/832,027, filed on Apr. 10, 2019.

(51) Int. Cl.
*A01K 27/00* (2006.01)
*A01K 13/00* (2006.01)

(52) U.S. Cl.
CPC .......... *A01K 27/003* (2013.01); *A01K 13/001* (2013.01)

(58) Field of Classification Search
CPC ............................ A01K 27/003; A01K 13/001
USPC ........................................................ 119/665
See application file for complete search history.

(56) References Cited

U.S. PATENT DOCUMENTS

| | | | | |
|---|---|---|---|---|
| 1,879,915 A * | 9/1932 | Smoot | .................. | A01K 13/001 119/665 |
| 3,023,971 A * | 3/1962 | Milhous | .............. | E04D 13/0765 401/137 |
| 3,026,129 A * | 3/1962 | Courtot | ............... | F16L 27/0849 285/184 |
| 3,067,083 A * | 12/1962 | Renhard | ................ | B29D 23/18 156/144 |
| 3,244,149 A * | 4/1966 | Bosko | .................. | A01K 27/005 D30/154 |
| 4,363,335 A * | 12/1982 | Tapper | ................ | E04D 13/0765 134/167 C |
| 4,673,129 A * | 6/1987 | Kologiy | .............. | E04D 13/0765 239/532 |
| 5,205,306 A * | 4/1993 | Peterson | ................ | A47K 3/287 134/104.2 |
| 5,297,514 A * | 3/1994 | Stout | ..................... | A01K 27/005 119/863 |
| 5,445,113 A * | 8/1995 | Hostetler | ................. | A01K 1/04 119/795 |
| D392,781 S * | 3/1998 | McKnight | ...................... | 401/137 |
| 5,727,580 A * | 3/1998 | Patterson | ............ | E04D 13/0765 134/115 R |
| 7,624,933 B2 * | 12/2009 | Boekelman | ............. | B08B 3/026 239/569 |
| 8,561,623 B2 * | 10/2013 | Lowenstein | ........ | E04D 13/0765 134/104.2 |

(Continued)

*Primary Examiner* — Ebony E Evans
(74) *Attorney, Agent, or Firm* — Malloy & Malloy, P.L.; William Eagan; Peter Matos (57) ABSTRACT

A combination animal leash and dog hose, as contemplated herein, may comprise a leash assembly partially disposed about a hose assembly, such that the leash assembly and the hose assembly are independently tensionable from each other. Such a leash assembly may comprise a leash retention member and handle member, which may be disposed to be length adjustable for the easy attachment about an attachment point, such as a water source, for ensuring an animal remains tethered without the need for the application of force by the user. Such a hose assembly may comprise an inlet and an outlet, disposed in fluid communication by a hose member, such that the hose assembly may be attached to a water source for the easy washing of an animal. Accordingly, such an apparatus may allow a user to wash an animal without exerting any force in controlling the animal.

11 Claims, 5 Drawing Sheets

(56) References Cited

U.S. PATENT DOCUMENTS

| | | | |
|---|---|---|---|
| 10,349,628 B2 * | 7/2019 | Valerio | A01K 13/001 |
| 10,405,712 B2 * | 9/2019 | Collar | E04D 13/0765 |
| 2006/0117671 A1 * | 6/2006 | Seasholtz | E04D 13/0765 |
| | | | 52/11 |
| 2006/0289036 A1 * | 12/2006 | Hilton | E04D 13/0765 |
| | | | 134/22.11 |
| 2011/0120386 A1 * | 5/2011 | Duczak | A01K 13/001 |
| | | | 119/665 |
| 2011/0232586 A1 * | 9/2011 | Levy | A01K 27/007 |
| | | | 239/289 |
| 2013/0152869 A1 | 6/2013 | Morton | |

* cited by examiner

COMBINATION LEASH AND HOSE

CLAIM OF PRIORITY

The present application claims the benefit under 35 U.S.C. § 119 to a prior-filed and U.S. Provisional Patent Application having Ser. No. 62/832,027, which was filed on Apr. 10, 2019, the contents of which are explicitly incorporated herein, in its entirety.

BACKGROUND OF THE INVENTION

Field of the Invention

The present invention is generally directed to a combination pet leash and hose with features facilitating the cooperative use thereof.

Description of the Related Art

Many pet owners enjoy spending time with their animals in public, outdoor spaces such as beaches and parks. However, such enjoyment typically necessitates a litany of additional items to ensure the safety and hygiene of both the animal and the people and/or space around them. Because an animal may often become quite dirty in its own enjoyment of the space, pet owners typically carry around a hose or other like apparatus in order to wash the animal prior to departing. Likewise, because animals may easily become overheated when playing in the sun, washing the animal with a hose or like apparatus may be necessary to ensure the animal's safety.

Although pet owners may typically carry around a hose as a solution to such problems, such a solution is often inadequate for a variety of reasons. For instance, as may be understood, owners may often struggle to carry around a separate hose due to the weight and bulk of such an object. Moreover, although many public places, such as beaches, parks, and the like provide hygienic facilities, (e.g., spigots, foot washes, and showers), constraints such as size, space, and interference of the animal may make use of such facilities, and any washing procedures associated therewith, difficult with a conventional hose.

For instance, such hygienic facilities may typically be disposed and/or oriented in a manner which may be difficult to wash an animal. Spigots and foot washes, for example, are low to the ground and may be difficult to maneuver a larger animal thereunder. Showers, on the other hand, given the height at which they are disposed, may make it more likely a user will accidentally step into the stream of water and thereby cause themselves to get wet.

Moreover, animals may typically be averse to baths or showers and may exhibit flight instincts in response to bathing. Such flight instincts exert tension in a leash held by an owner, thereby necessitating the exertion of force on the owner's part in order to maintain control over the animal. Consequently, and due to the frantic nature in which an animal may behave, a leash, and any other attached structure, may be subjected to variable forces in both magnitude and direction throughout the animal washing process.

Further, many municipal ordinances operate to safeguard both the animal and the general public by requiring pet owners to follow certain procedures when in public, such as ensuring an animal is tethered to a leash at all times. Unfortunately, such an ordinance often makes washing an animal in public spaces even more difficult, as pet owners may struggle to hold and exert control over the animal while attaching hose fittings to a water source. Such a problem may be exacerbated when considering the aforementioned instinct of certain animals to flee from the prospect of a bath or shower, and the potentially vulnerable position an owner may find themselves in when attaching hose fittings to a water source. Moreover, it may often prove difficult for pet owners to actually progress through the requisite steps of washing an animal while exerting control over the animal with one hand and holding a hose in the other hand, particularly where acts such as shampooing and/or scrubbing are required.

Accordingly, there is a need in the art to provide a safe, convenient, and effective solution for cleaning an animal at a public facility. Such a proposed solution should seek to account for many, if not all, of the aforementioned problems currently present in the art. For instance, such a proposed solution should seek to allow an owner to relinquish control of an animal while attaching hose fittings to a water source. Likewise, such a solution should seek to ensure the variable forces which may be exerted thereon by an animal will not damage the apparatus itself, nor the public facilities with which it is used. Finally, such a solution should seek to ensure the safety of the animal, the owner, and the general public, while simultaneously providing a convenient apparatus disposed for use amongst people of all ages and sizes.

SUMMARY OF THE INVENTION

The present invention is directed to a system, device, and/or apparatus satisfying the need to provide a safe, convenient, and effective solution for cleaning an animal at a public facility. Furthermore, an apparatus in accordance with at least one embodiment of the present invention may effectively reduce the impact and consequences resulting from the forces imparted by a struggling animal on the cleaning procedure, the apparatus, or any connections thereto, while likewise ensuring an animal may be attached to a tensionably supported leash at all times. Accordingly, in at least one embodiment of the present invention, an apparatus may be disposed to combine a pet leash and a hose in such a manner to effectively satisfy the aforementioned needs. Such an apparatus may comprise a leash assembly, which may include a handle member at its proximal end and a leash retention member at its distal end, wherein the handle member and the leash retention member are interconnected through a leash member disposed therebetween. As may be understood, and as will be used herein, the proximal end of such a leash assembly may be held by a user while the distal end may be used for attachment to an animal wearing a collar or other like apparatus.

Further, such an apparatus may comprise a hose assembly, which may include an inlet at its proximal end and an outlet at its distal end, wherein the inlet and the outlet are disposed in fluid communication through a hose member disposed therebetween. As may be understood, and as will be used herein, such an inlet may comprise a faucet adapter or like hose connection element, such as a universal fitting, for attachment to a water source; likewise, such an outlet may comprise a nozzle, or other like structure, to expel water and/or fluid therefrom.

In such an apparatus, the leash assembly may be disposed at least partially about the hose assembly. For example, in at least one embodiment, the leash member may comprise a sleeve, sheath, envelopment, or other like structure disposed at least partially about the hose assembly. Such a structural disposition of the leash member may include at least a proximal sleeve aperture located at the proximal end thereof and a distal sleeve aperture located at the distal end thereof, however further embodiments comprising additional apertures and/or a partially open leash member are likewise contemplated herein. Further, it may be understood the hose assembly may be situated at least partially within the sleeve of the leash member and be disposed for egress through at least one of the proximal and distal sleeve apertures. In the event the hose assembly is longer than the leash assembly, it may be understood the hose assembly may be disposed through both of the apertures, such that the inlet is disposed outside of the proximal sleeve aperture while a distal extension of the hose member extends outside of the distal sleeve aperture. Alternatively, as may be understood, the leash member may merely wrap around a portion of the hose assembly such that the hose assembly is merely clipped into the leash member or otherwise secured through frictional forces.

As may be understood, in at least one embodiment, the disposition of the leash assembly at least partially about the hose assembly may be structured so as to ensure each assembly is independently tensionable from the other. In other words, such disposition may ensure any tensile forces and/or compressive forces induced in and/or applied to the leash assembly will not be transferred into the hose assembly, and vice versa. Accordingly, in such an embodiment, the leash assembly may support the hose assembly but may remain distinct therefrom. For instance, in an embodiment wherein the leash member comprises a sleeve for housing the hose assembly, it may be understood the hose assembly may remain supported by, but unattached from, the leash assembly. Alternatively, in an embodiment wherein the leash assembly merely wraps around the hose assembly and connects thereto via frictional forces, it may be understood the frictional forces acting thereon may allow independent tensioning thereof.

In a further embodiment, the handle member may be separable and retained and/or fastened together by a handle retention member, such as a side squeeze buckle, clip, or other like structure. Further, the handle member may include a length adjustment assembly, such as a sliding strap lock disposed on an elongated handle member portion, a hole and pin disposed on same, or any other like structure, whereby the circumference of the handle member may be increased and/or decreased according to a user's needs. Accordingly, as may be understood, the handle member may be appropriately sized by a user for the disposal around an attachment point. Such an attachment point may comprise a secure structure such as the base of a water source, including, without limitation, a spigot, foot wash, or shower. Thus, the circumference of the handle member may be adapted to fit a given attachment point, thereby securing an animal without requiring a user to exert force and/or control over the animal. Such a handle member may further include a handle grip, which may be structurally disposed to reduce the effect of tensile and/or compressive forces on a user's hand.

In such an apparatus, the leash assembly may be disposed at least partially about the hose assembly. For example, in at least one embodiment, the leash member may comprise a sleeve, sheath, envelopment, or other like structure disposed at least partially about the hose assembly. Such a structural disposition of the leash member may include at least a proximal sleeve aperture located at the proximal end thereof and a distal sleeve aperture located at the distal end thereof, however further embodiments comprising additional apertures and/or a partially open leash member are likewise contemplated herein. Further, it may be in accordance with the aforementioned structural features, it may be understood at least one embodiment of the present invention may comprise an apparatus designed to secure an animal to an attachment point, such as a secure structure at the base of a water source, via the handle member. Because a user need not exert control or exercise force in securing the animal once the handle member is attached thereto, the user may be unrestricted when attaching the inlet to a water source. Thus, the ease in which a user may attach the inlet to a water source may be improved. Moreover, as may be understood, because the leash assembly and the hose assembly are disposed to be independently tensionable, any tensile and/or compressive forces exerted on the leash by the animal will not be imparted onto the hose assembly, including the inlet. Accordingly, after the attachment of the inlet to the water source, any tensile and/or compressive forces imparted on the leash assembly will not disrupt the inlet's connection, thereby ensuring the water flow of the water source into the hose member is not disrupted and further preventing any damage caused by the forceful removal of the inlet from the water source.

Yet additional features may be disposed in further embodiments of the present invention to ensure the effective and efficient use of such an apparatus. For instance, as previously stated, the outlet may comprise a nozzle structured to expel fluid from the hose upon a user's influence. Additionally, such a nozzle may be disposed in connection with a fluid reservoir, which may comprise at least a container to store a fluid, such as shampoo, and a spout, nozzle, or other like structure to dispel such fluid therefrom. As may be understood, such a fluid reservoir may be built into the outlet or alternatively be disposed on an outside portion thereof.

Further, it may be understood the hose assembly of such an apparatus may be disposed in least two orientations, namely, an affixed orientation and a detached orientation. Specifically, the hose assembly may be disposed in a detached orientation when the hose is in use, such as when the inlet is connected to a water source and the outlet is being used to wash an animal. Conversely, the hose assembly may be disposed in an affixed orientation when the hose is not in use, such as when the apparatus as a whole is used to walk an animal. To alleviate the burden of transporting the hose member in such an affixed orientation, particularly where the hose member comprises a distal extension and therefore has a length extending beyond the distal end of the leash assembly, it may be understood such distal extension may be wrapped along the leash assembly and back towards the proximal end of the apparatus, before being attached to the leash assembly by at least one fastener. In this manner, the hose assembly may be securely connected to the leash assembly for the easy transportation and use of the apparatus when disposed in such an affixed orientation. Moreover, in order to prevent the occurrence of kinks or creases in the hose member which may occur when same is disposed in an affixed orientation, the hose member may comprise a metal coiled hose, or alternatively, a metal coil, or other like structure, may be disposed around the distal extension.

Accordingly, when combined in at least one embodiment, the foregoing structural features may solve a variety of deficiencies in the prior art. Specifically, such partial disposition of the leash assembly about the hose assembly, and the independent tensionability which may follow therefrom, in conjunction with the attachment of the handle member around an attachment point, may allow a user to easily attach the inlet to a water source and subsequently operate the outlet to wash an animal without the need to exert control over the animal in the process. Likewise, such structural features operatively ensure any such tensile and/or compressive forces imparted on the leash member by an animal do not act upon the inlet, thereby ensuring the connection of the inlet to a water source remains both secure and unlikely to cause damage thereto. Finally, such additional structural features, such as the affixed orientation in which a distal extension of the hose member may be disposed, may ensure such a device may be easily operable by people of all ages and sizes in conjunction with animals of all sizes.

These and other objects, features, and advantages of the present invention will become clearer when the drawings as well as the detailed description are taken into consideration.

BRIEF DESCRIPTION OF THE DRAWINGS AND ONE PREFERRED EMBODIMENT

For a fuller understanding of the nature of the present invention, reference should be had to the following detailed description taken in connection with the accompanying drawings in which.

DETAILED DESCRIPTION

The present invention is directed to an assembly, device, and/or apparatus which may effectively and conveniently provide a pet owner with a means to both walk and wash an animal in public, outdoor spaces, such as beaches and parks. As represented by the accompanying Figures, and with initial reference to FIGS. 1, 2, and 3 the present invention may be represented by an apparatus 10 comprising a proximal end 11 and a distal end 12. The apparatus 10 may further comprise a leash assembly 100 disposed at least partially about a hose assembly 200, as will be further discussed hereafter.

Figure 2:
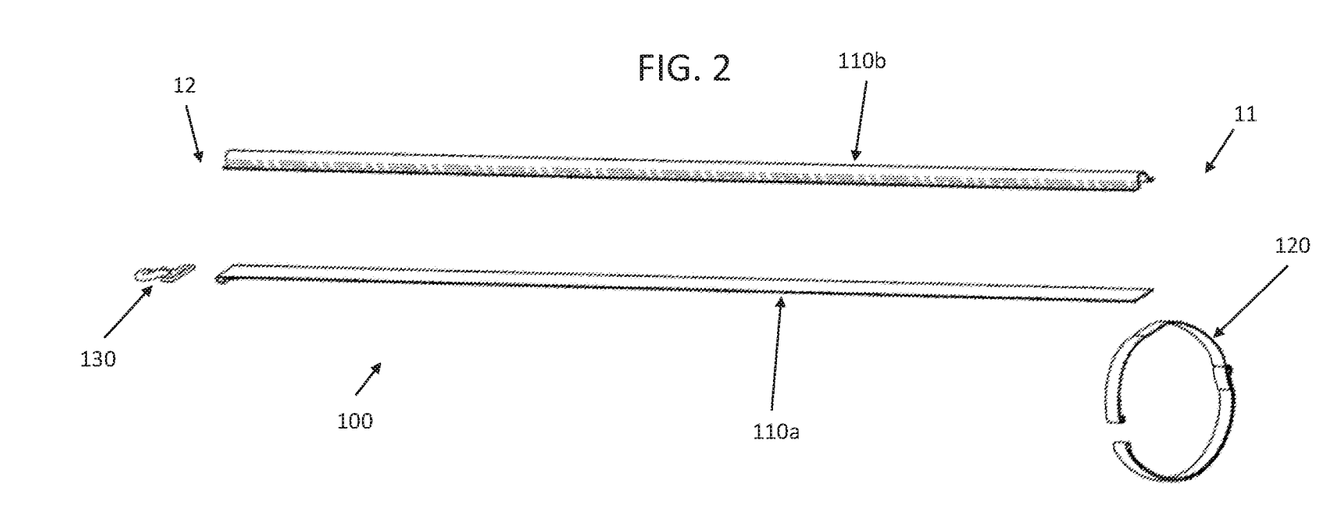
FIG. 2 depicts an exploded view of the leash assembly in accordance with the embodiment depicted in FIG. 1.

Specifically, such a leash assembly 100, as depicted in FIG. 2, may include a handle member 120 disposed at the proximal end 11 thereof. Conversely, a leash retention member 130 may be disposed at the distal end 12 thereof. Such a leash retention member 130 may comprise, for instance, a spring clip, carabiner, snap clip, tag clip, or other like fastening element designed to retain the leash assembly 100 to a tethered animal, whether through a collar disposed thereon or otherwise. Further, as may be seen, such handle member 120 and leash retention member 130 may be disposed in interconnecting relation through a leash member 110 disposed therebetween. Such leash member 110 may be constructed, in alternative embodiments, as one monolithic member or as a plurality of separate leash member 110 portions. For instance, as depicted in FIG. 2, such a leash member 110 may comprise two separate portions 110a, 110b which may be securely attached together through means such as sewing, fabric glue, hook-and-loop fasteners, or any other like means. Moreover, such a leash member 110 may comprise a material, such as nylon webbing, disposed to stretch and retract upon the application of tensile and/or compressive forces while maintaining its strength and durability.

Figure 3:
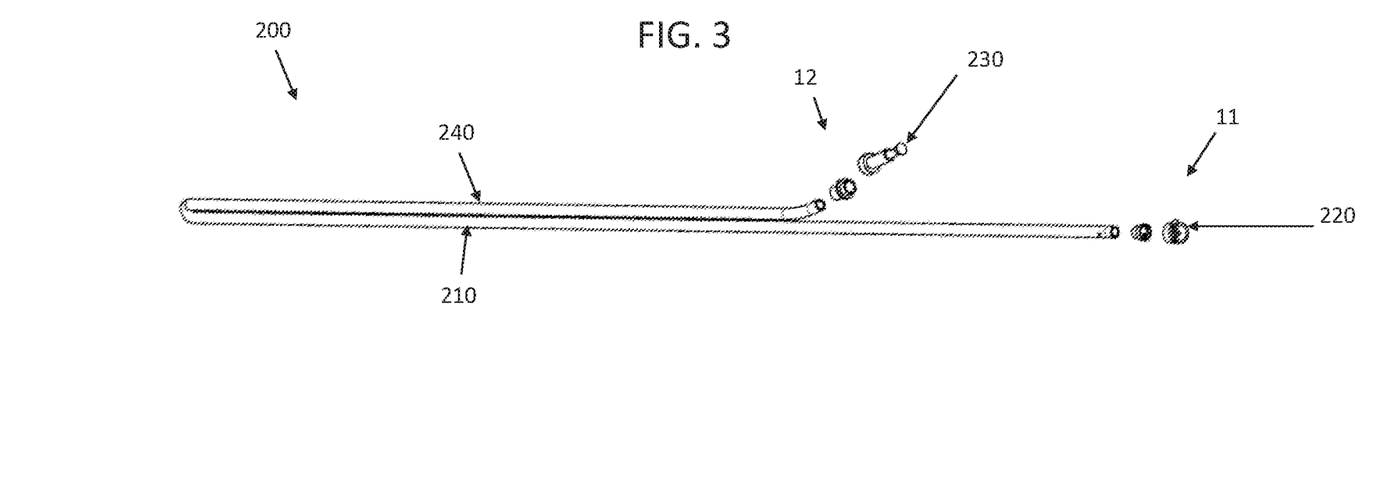
FIG. 3 depicts an exploded view of a hose assembly in accordance with the embodiment depicted in FIG. 1.

Meanwhile, as depicted in FIG. 3, such a hose assembly 200 may include an inlet 220 disposed at the proximal end 11 and an outlet 230 disposed at the distal end 12. Such an inlet 220 may comprise, for instance, a faucet adapter or like hose connection element, such as a universal fitting, for attachment to a water source. Likewise, such an outlet 230 may comprise a nozzle or other like structure disposed to expel water and/or fluid therefrom, whether at variable pressure, variable spray patterns, or otherwise. Further, such inlet 220 and outlet 230 may be interconnected in fluid communication through a hose member 210 disposed therebetween. Such a hose member 210 may comprise, in at least one embodiment, a metal coiled hose, to prevent kinks and/or deformations therein.

Returning to FIG. 1, such disposition between the leash assembly 100 and the hose assembly 200 may be seen in accordance with the embodiment depicted therein. For instance, as may be seen in FIG. 1, the hose member 210 may be disposed at least partially within the leash member 110. Further, such inlet 220 may be disposed exterior to the leash member 110. Likewise, such outlet 230 may also be disposed exterior to the leash member 110. As may be further seen, such outlet 230 may be disposed near the proximal end 11 of the device by way of a distal extension 240 disposed on such hose member 210. Such distal extension 240 may be secured to the leash member 110 according to at least one fastener, as will be discussed hereafter.

Figure 4:
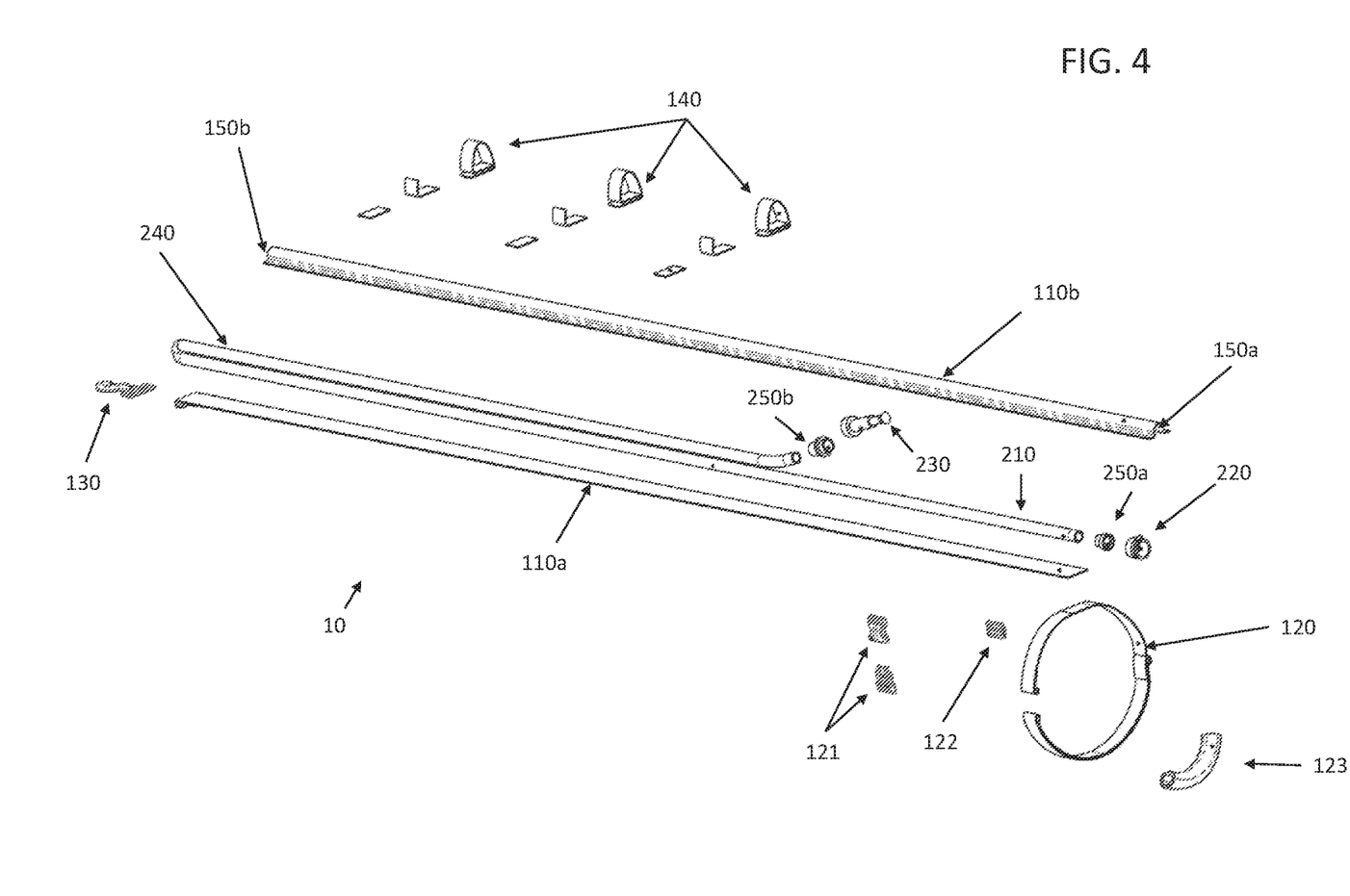
FIG. 4 depicts an exploded view of a combined animal leash and hose in accordance with one embodiment of the present invention.

With reference to FIG. 4, it may be seen yet additional structural features may be disposed in connection with at least one embodiment of the present invention. For instance, such inlet 220 and outlet 230 may be removably connected to the hose assembly 200 via attachment members 250a, 250b, which may comprise, for instance, threaded or barbed hose attachments as may be understood by one skilled in the art. Accordingly, as may be understood, a user may conveniently remove and/or reattach such inlet 220 and outlet 230 according to his or her needs. Moreover, attachment members 250a, 250b may comprise male or female connection types, and may further comprise structural features disposed for the quick attachment of the inlet 220 and/or outlet 230, or a swivel adapter for same, as may be understood by one skilled in the art.

Further, it may be seen the handle member 120 may be disposed to be separable, as previously mentioned, and may include at least a handle retention member 121 and a length adjustment assembly 122. As may be understood, such handle retention member 121 may comprise, for instance, a side squeeze buckle, clip, or other like structure. Such length adjustment assembly 122 may comprise, for instance, a sliding strap lock disposed on an elongated handle member 120 portion, a hole and pin disposed on same, or any other like structure. Accordingly, as may be understood, such separable handle member 120, handle retention member 121 and length adjustment assembly 122 may, in conjunction, allow a user to increase and/or decrease the circumference of the handle member 120 according to a user's needs. Moreover, such handle member 120 may be separated and subsequently disposed about an attachment point, such as a secure structure including, without limitation, the base of water source, which may allow the apparatus 10 to ensure an animal is tensionally supported at all times without requiring a user to exert any force thereon. Finally, as may be seen, such handle member 120 may further comprise a grip component 123 disposed to alleviate the forces exerted by said handle member 120 on a user's hand. Accordingly, such grip component may be comprised of, for example, EVA foam, silicone, rubber, or other like material, elastomeric or otherwise, disposed to reduce the force between the grip of a user's hand and the normal force applied thereon by the handle member 120.

With further reference to FIG. 4, it may be seen the leash assembly 100 of the embodiment depicted therein comprises a leash member 110 formed of two separate portions 110a, 110b. Such two separate portions 110a, 110b of the leash member 110 may, as previously mentioned, be securely attached together to form the leash member 110. As a result, it may be seen the leash member 110 may further comprise two apertures at each end thereof, namely, a proximal leash aperture 150a and a distal leash aperture 150b. Accordingly, it may be seen the leash member 110 may structurally comprise a sleeve, sheath, casing, and/or enclosure comprising at least two apertures disposed therein. Such structural characteristics may allow for the leash assembly 100 to be disposed at least partially about the hose assembly 200. However, as may be understood, such a leash member 110 may comprise alternative embodiments in accordance with the disclosure herein. For instance, such a leash member 110 may instead merely wrap around a portion of the hose assembly 200 such that the hose assembly 200 is merely clipped into the leash member 110 or otherwise secured through frictional forces. Such a leash member 110 may accordingly comprise no such apertures 150, or only one aperture 150. Likewise, such a leash member 110 may alternatively comprise a single portion with at least two apertures 150a, 150b forming a sleeve therethrough.

As may be understood, such structural disposition between said leash assembly 100 and said hose assembly 200 may allow each assembly to be independently tensionable from the other. In other words, any such tensile and/or compressive forces imparted on said leash assembly 100 will not be imparted on said hose assembly 200, and vice versa. Accordingly, in such an embodiment of the present invention, the leash assembly 100 may remain distinct from said hose assembly 200. However, as may be further understood, said leash assembly 100 may be disposed to structurally support said hose assembly 200, for instance as a result of the material from which said leash assembly 100 is comprised, such that said hose assembly 200 will not cause said leash assembly to be stretched or otherwise deformed as a result of the weight of same.

Figure 5:
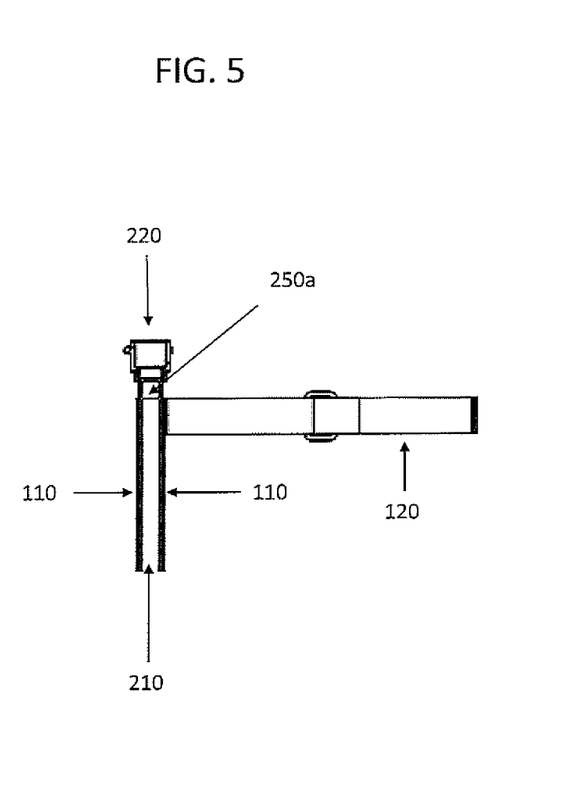
FIG. 5 depicts a cross-sectional view of the proximal end of the embodiment depicted in FIG. 4.

Moreover, the separability of the handle member 120, and ability to dispose the handle member 120 about an attachment point, may work in conjunction with such independent tensionability between the leash assembly 100 and the hose assembly 200. More specifically, and as may be seen with additional reference to FIG. 5, which shows the handle member 120 may be attached solely to the leash member 110, because the hose assembly 200 is independently tensionable from the leash assembly 100, any tensile and/or compressive forces originating from a tethered animal and thereby imparted on the leash assembly 100 may, when the handle member 120 is disposed about an attachment point, travel from the leash retention member 130, through the leash member 110, and into the handle member 120, without affecting the hose assembly 200, including, without limitation, the inlet 220 disposed thereon. Accordingly, such tensile and/or compressive forces will be solely imparted on the attachment point upon which the handle member 120 is supported, and will not affect the attachment of the inlet 220 to the water source.

Figure 1:
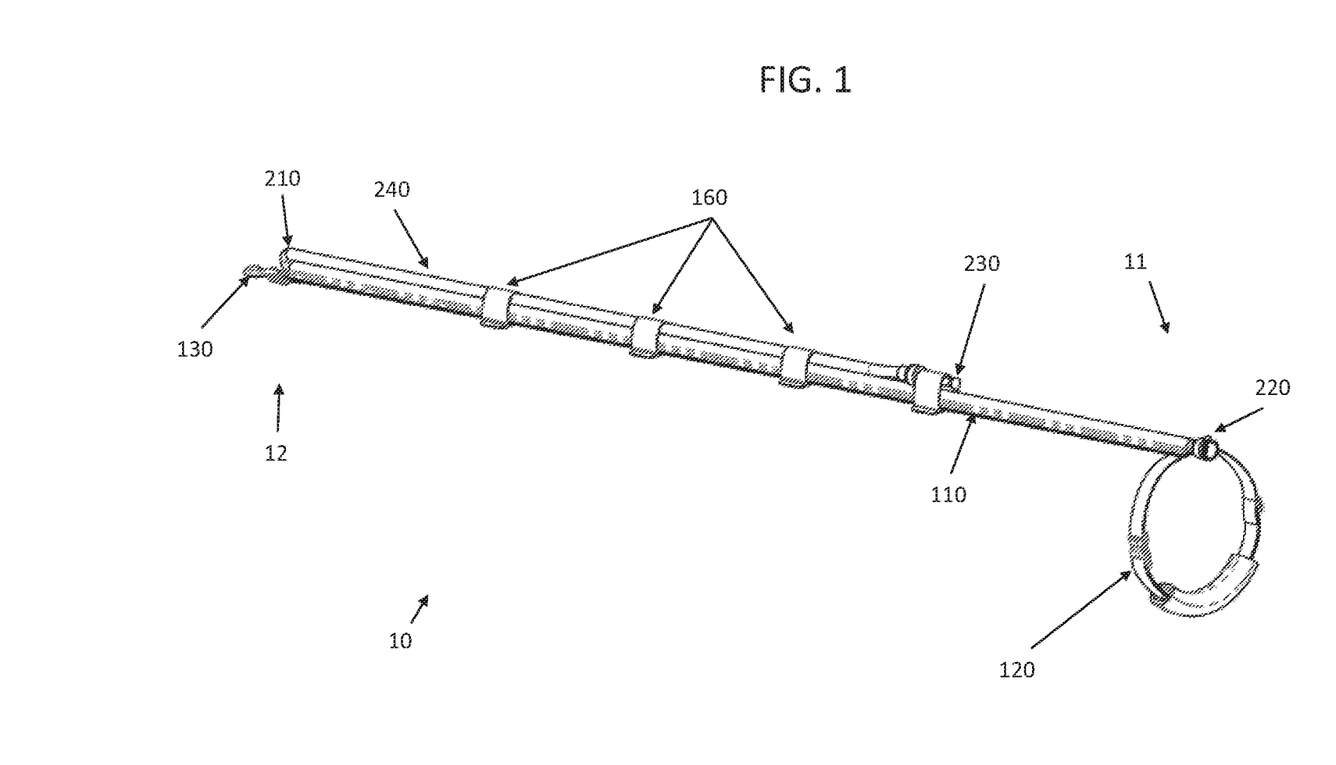
FIG. 1 depicts a perspective view of a combined animal leash and hose in accordance with one embodiment of the present invention.
Figure 6:
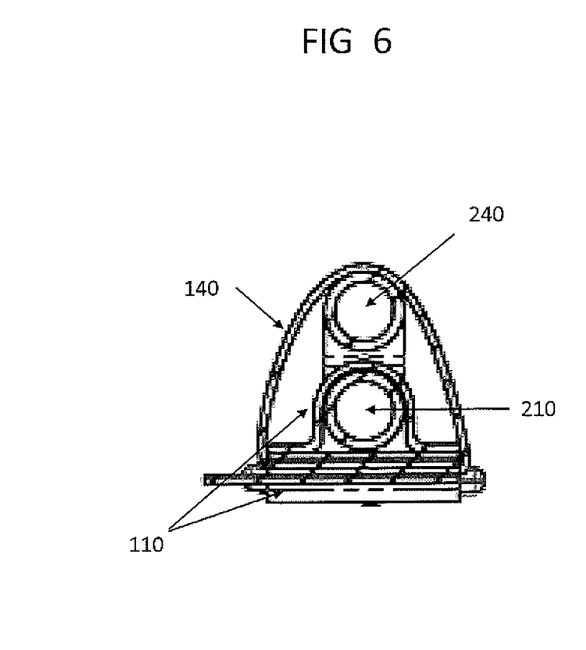
FIG. 6 depicts a cross-sectional view of the distal extension disposed in an affixed orientation of the embodiment depicted in FIG. 4.
Figure 7:
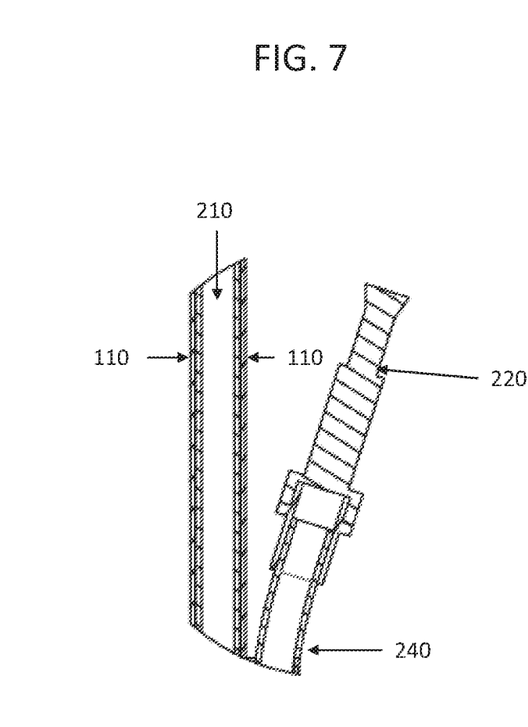
FIG. 7 depicts a cross-sectional view of the outlet, in accordance with the embodiment depicted in FIG. 4.

With further reference to FIGS. 1 and 4, and additional reference to FIGS. 6 and 7, it may be seen, as previously mentioned, in at least one embodiment of the present invention the hose assembly 200 may a comprise hose member 210 including a distal extension 240. As previously stated, such distal extension 240 may comprise a length of the hose member 210 which extends beyond the distal sleeve aperture 150b of the leash member 110, such that the distal extension 240, and the outlet 230 disposed thereon, may be disposed exterior to the leash member 110. As may be understood, the configuration of such distal extension 240 may depend upon the orientation of the apparatus 10 at any given time. For instance, when the distal extension 240 is disposed in a detached orientation, such as when the inlet 220 is attached to a water source and the user is washing an animal, the distal extension 240 may remain unattached from the leash assembly 100. In such a configuration, a user may take hold of the distal extension 240 and direct the outlet 230 at the animal without at least some restriction exhibited by the leash assembly 100.

In contrast, when the distal extension 240 is disposed in an affixed orientation, such as when the inlet 220 is not attached to a water source and the user is simply walking a tethered animal, the distal extension 240 may be wrapped along the leash assembly 100, back towards the proximal end 11 of the apparatus 10. In order to ensure the distal extension 240 is not dragging along the ground in such an affixed orientation, the distal extension 240 may be attached to the leash assembly 100 by at least one fastener 140. Such at least one fastener 140 may comprise, for instance, a hook-and-loop fastener, or any other like structure, such as a sliding strap lock, buckles, or clips. Likewise, as may be understood, such at least one fastener 140 may be disposed about the distal extension 240, such as in the embodiments depicted in FIGS. 1 and 6, wherein such at least one fastener 140 ensures the distal extension 240 is tightly held alongside the leash member 110. Alternatively, as may be understood, further embodiments may instead comprise at least one fastener 140 not disposed about the distal extension 240, such as a length of hook-and-loop fasteners disposed directly on the distal extension 240 for connection to the leash assembly 100.

Accordingly, operative disposition between such a detached orientation and an affixed orientation may allow a user to easily switch between washing an animal and the easy transportation and use of the apparatus 10 as a whole. Further, in order to prevent the occurrence of kinks or creases in the hose member 210 and/or distal extension 240 when the device 10 is disposed in an affixed orientation, it may be understood the hose member 210 and distal extension 240 thereof may comprise, for instance, a metal coiled hose. Likewise, alternative embodiments may include a metal coil, or other like structure, disposed about the hose member 210 and/or distal extension 240, which may operate to prevent such kinks or creases therein.

Figure 8:
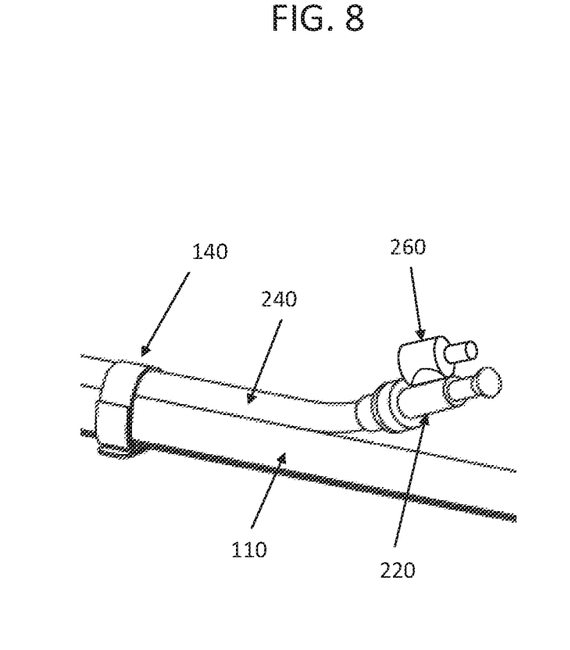
FIG. 8 depicts a perspective view of the outlet, wherein the outlet includes a fluid reservoir, in accordance with one embodiment of the present invention.

In an additional embodiment of the present invention, as may be seen with reference to FIG. 8, the outlet 220 of the hose assembly 200 may further comprise a fluid reservoir 260. Such fluid reservoir 260 may comprise at least a container to store a fluid, such as shampoo, and a spout, nozzle, or other like structure to dispel fluid therefrom. As may be understood, such fluid reservoir 260 may be built into the outlet 220, or alternatively, disposed on an exterior portion thereof. Moreover, such fluid reservoir 260 may comprise yet additional structural and/or functional features which may improve the use thereof. For instance, such a fluid reservoir 260 may comprise a hand opening so it does not affect a user's grip of the outlet. Further, such fluid reservoir 260 may alternatively be detachable from the outlet 220, so it may be only attached thereon when in use.

Accordingly, when combined in at least one embodiment of the present invention, the aforementioned structural features may solve the foregoing deficiencies found in the prior art. For instance, the structural disposition between the leash assembly 100 and the hose assembly 200, and the independent tensionability which follows therefrom, in conjunction with the ability to attach the handle member 120 about an attachment point, may allow a user to easily ensure an animal remains tethered at all times, including when attaching the inlet 220 to a water source and operating the outlet 230 to wash the animal, without the risk of damaging public property as a result of the animal's movement. Moreover, additional structural features, such as the fastening of the distal extension 240 to the leash assembly 100 may allow the apparatus 10 to be easily operable for people of all ages and sizes. Finally, yet additional structural features may operate to improve user experience in a variety of ways, including, without limitation, the easy removal and attachment of the inlet 220 and outlet 230 from the hose assembly 200, and the provision of a fluid reservoir 260 for the additional storage and application of shampoos and other like fluids in the washing process.

Since many modifications, variations, and changes in detail can be made to the described embodiments of the present invention, it is intended all matters in the foregoing description and shown in the accompanying drawings be interpreted as illustrative, and not in a limiting sense. Thus, the scope of the present invention should be determined by the appended claims and their legal equivalents.

What is claimed is:

1. A combined animal leash and hose apparatus comprising:
    a proximal end and a distal end;
    a leash assembly disposed at least partially about a distinct hose assembly;
    said leash assembly comprising a handle member at said proximal end, a leash retention member at said distal end, and a leash member disposed in interconnecting relation therebetween, said handle member having an adjustable circumference;
    said hose assembly comprising an inlet at said proximal end and an outlet at said distal end,
    said inlet and said outlet disposed in fluid communication through a hose member disposed therebetween;
    said hose assembly further comprising a distal extension, said distal extension being attached to said leash assembly by at least one fastener when said hose assembly is disposed in an affixed orientation; and
    said leash assembly disposed to be independently tensionable from said hose assembly.

2. The apparatus of claim 1, wherein said distal extension is unattached from said leash assembly when said hose assembly is disposed in a detached orientation.

3. The apparatus of claim 1, wherein said handle member is separable and retained by a handle retention member for disposition of said handle member around an attachment point.

4. The apparatus of claim 1, wherein said handle member includes a length adjustment assembly.

5. The apparatus of claim 1, wherein said hose member comprises a metal coiled hose.

6. The apparatus of claim 1, wherein said inlet comprises a faucet adapter.

7. A combined animal leash and hose apparatus capable of securing an animal to an attachment point and connecting to a water source, said apparatus comprising:
    a proximal end and a distal end;
    a leash assembly disposed at least partially about a hose assembly;
    said leash assembly comprising a handle member at said proximal end, a leash retention member at said distal end, and a leash member disposed in interconnecting relation therebetween;
    said hose assembly comprising an inlet at said proximal end and an outlet at said distal end;
    said inlet and said outlet disposed in fluid communication through a hose member disposed therebetween, said inlet further dimensioned and configured to be connected to the water source;
    said hose assembly further comprising a distal extension;
    said handle member disposed to be separable and fastened by a handle retention member for disposition around the attachment point, thereby anchoring the animal to the attachment point; and
    said leash assembly disposed such that tensile and compressive forces imparted on said leash retention member are solely tensionably supported between said leash retention member and said handle member through said leash member.

8. The apparatus of claim 7, said leash assembly further comprising a sleeve with at least two apertures, wherein said hose assembly is situated at least partially within said sleeve and disposed for egress through said at least two apertures.

9. The apparatus of claim 7, wherein said distal extension is attached to said leash assembly by at least one fastener when said hose assembly is disposed in an inactive orientation and is unattached from said leash assembly when said hose assembly is disposed in an active orientation.

10. The apparatus of claim 7 wherein said hose member comprises a metal coiled hose.

11. A combined animal leash and hose apparatus comprising:
    a proximal end and a distal end;
    a leash assembly disposed at least partially about a distinct hose assembly;
    said leash assembly comprising a handle member at said proximal end, a leash retention member at said distal end, and a leash member disposed in interconnecting relation therebetween, said handle member having an adjustable circumference;
    said hose assembly comprising an inlet at said proximal end and an outlet at said distal end,
    said inlet and said outlet disposed in fluid communication through a hose member disposed therebetween;
    said leash assembly disposed to be independently tensionable from said hose assembly; and
    said leash assembly further comprising a sleeve with at least two apertures, wherein said hose assembly is situated at least partially within said sleeve and disposed for egress through said at least two apertures.

* * * * *